United States Patent
Kim

(10) Patent No.: US 10,499,376 B2
(45) Date of Patent: Dec. 3, 2019

(54) METHODS FOR MANAGING RESOURCE BASED ON OPEN INTERFACE AND APPARATUSES THEREOF

(71) Applicant: KT CORPORATION, Gyeonggi-do (KR)

(72) Inventor: Ha Sung Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/007,050

(22) Filed: Jun. 13, 2018

(65) Prior Publication Data

US 2018/0368109 A1  Dec. 20, 2018

(30) Foreign Application Priority Data

Jun. 16, 2017 (KR) .................. 10-2017-0076924
May 9, 2018 (KR) .................. 10-2018-0053053

(51) Int. Cl.
*H04W 72/04* (2009.01)
*H04W 76/30* (2018.01)
*H04W 76/10* (2018.01)

(52) U.S. Cl.
CPC ............ *H04W 72/04* (2013.01); *H04W 76/10* (2018.02); *H04W 76/30* (2018.02)

(58) Field of Classification Search
CPC .................................................... H04W 72/04
USPC ........................................................ 370/329
See application file for complete search history.

(56) References Cited

U.S. PATENT DOCUMENTS

| | | | |
|---|---|---|---|
| 7,602,726 B1 * | 10/2009 | Sundaresan | H04L 45/10 370/237 |
| 2017/0374581 A1 * | 12/2017 | Dao | H04W 76/40 |
| 2018/0084464 A1 * | 3/2018 | Ozturk | H04W 76/25 |
| 2018/0123878 A1 * | 5/2018 | Li | H04L 41/04 |
| 2018/0198561 A1 * | 7/2018 | Tsai | H04L 5/0064 |
| 2018/0199384 A1 * | 7/2018 | Mizikovsky | H04W 76/38 |
| 2018/0199398 A1 * | 7/2018 | Dao | H04W 36/14 |
| 2018/0213579 A1 | 7/2018 | Hong et al. | |
| 2018/0270778 A1 * | 9/2018 | Bharatia | H04W 36/0011 |
| 2018/0279168 A1 * | 9/2018 | Jheng | H04W 76/20 |
| 2018/0279186 A1 * | 9/2018 | Park | H04W 36/0077 |
| 2018/0279375 A1 * | 9/2018 | Jeon | H04W 72/14 |
| 2018/0279376 A1 * | 9/2018 | Dinan | H04W 74/0833 |
| 2019/0132790 A1 * | 5/2019 | Lee | H04W 16/24 |
| 2019/0150220 A1 * | 5/2019 | Byun | H04W 80/08 |
| 2019/0158360 A1 * | 5/2019 | Xu | H04L 41/12 |
| 2019/0159274 A1 * | 5/2019 | Hong | H04W 28/02 |
| 2019/0166526 A1 * | 5/2019 | Xu | H04W 36/0033 |
| 2019/0166527 A1 * | 5/2019 | Oketani | H04W 36/0044 |

(Continued)

FOREIGN PATENT DOCUMENTS

KR  10-2016-0135090 A  11/2016

*Primary Examiner* — Peter G Solinsky
(74) *Attorney, Agent, or Firm* — IP Legal Services, LLC

(57) ABSTRACT

Provided are a method of a central unit (CU) included in a gNB for managing radio resources and an apparatus thereof. The method may include generating a UE context setup message to be transmitted to one or more distributed units (DUs) associated with the central unit, transmitting the UE context setup message to the one or more DUs through a fronthaul interface, and receiving a response message for the UE context setup message from the one or more DUs through the fronthaul interface.

18 Claims, 17 Drawing Sheets

(56) References Cited

U.S. PATENT DOCUMENTS

2019/0174346 A1* 6/2019 Murray ................. H04W 24/10
2019/0174561 A1* 6/2019 Sivavakeesar ........ H04W 76/10

* cited by examiner

METHODS FOR MANAGING RESOURCE BASED ON OPEN INTERFACE AND APPARATUSES THEREOF

CROSS REFERENCE TO RELATED APPLICATION

This application claims priority from Korean Patent Application Nos. 10-2017-0076924 & 10-2018-0053053, filed on Jun. 16, 2017 & May 9, 2018, which are hereby incorporated by reference for all purposes as if fully set forth herein.

BACKGROUND OF THE INVENTION

1. Field of the Invention

The present disclosure relates to a resource management technology in a gNodeB (gNB) using a next-generation radio access technology, that is, 5G technology, and more particularly, to a procedure of a central unit included in the 5G gNB for setting up user equipment (UE)/bearer context using an internal interface and a fronthaul interface.

2. Description of the Prior Art

Along with the evolution of communication systems, a wide variety of wireless terminals have been introduced to consumers, such as companies and individuals.

Mobile communication systems based on the 3rd generation partnership project (3GPP), such as Long Term Evolution (LTE), LTE-Advanced, and 5G are a high-speed and large-capacity communication system capable of transmitting and receiving various types and large amount of data, such as video data and radio data, at a high speed. Also, a next generation radio access network technology, after LTE-Advanced, has been developed for enabling more terminals to transmit and receive data and providing a higher Quality of Service (QoS). For example, development of a "5G network" has been conducted mostly by the 3GPP.

In the 5G, there is a need to provide various transmission speeds, reliability, delay requirements, and services. This is to provide services customized based on a place or a terminal. Accordingly, various types of service provision apparatuses (e.g., a base station) are required.

To this end, it is necessary to dynamically configure even a base station based on a place or based on a service. In addition, when various types of base stations are configured, mutual compatibility between the base stations is very important.

In such a situation, it is required to develop a specific procedure for internally or externally setting up and releasing resources according to a protocol in order for a dynamically configured base station to communicate with a terminal.

SUMMARY OF THE INVENTION

In the foregoing background, the present disclosure is directed to a method and apparatus for setting resources between a plurality of elements constituting a base station.

Also, the present disclosure is directed to a method and apparatus for efficiently and separately controlling a control plane and a user plane by using an internal protocol of a base station.

To solve the foregoing problem, an embodiment that has been devised to solve the above-mentioned problems provides a method of a central unit (CU) included in a base station for managing radio resources. The method may include generating a user equipment (UE) context setup message to be transmitted to one or more distributed units (DUs) associated with the CU, transmitting the UE context setup message to the one or more DUs through a fronthaul interface, and receiving a response message for the UE context setup message from the one or more DUs through the fronthaul interface.

Also, an embodiment provides a CU of a base station for managing radio resources. The CU may include a controller configured to generate a UE context setup message to be transmitted to one or more DUs associated with the CU, a transmitter configured to transmit the UE context setup message to the one or more DUs through a fronthaul interface, and a receiver configured to receive a response message for the UE context setup message from the one or more DUs through the fronthaul interface.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
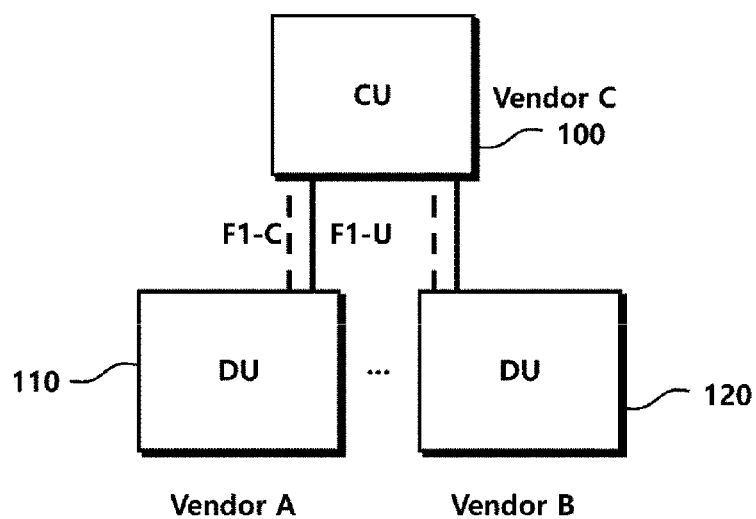
FIG. 1 illustrates a fronthaul interface and a separation configuration structure of a base station according to an embodiment.

Hereinafter, embodiments of the present disclosure will be described in detail with reference to the accompanying drawings. When assigning a reference number to each component shown in the drawings, it should be noted that the same components are given the same reference numbers even though they are shown in different drawings. Further, in the following description of the present disclosure, a detailed description of known functions and configurations incorporated herein will be omitted when it is determined that the description may make the subject matter of the present disclosure unclear.

In this specification, a machine type communication (MTC) terminal may refer to a terminal that supports low cost (or low complexity), a terminal that supports coverage enhancement, or the like. In this specification, the MTC terminal refers to a terminal that supports low cost (or low complexity) and coverage enhancement, or the like. Alternatively, in this specification, the MTC terminal refers to a terminal that is defined in a predetermined category for supporting low cost (or low complexity) and/or coverage enhancement.

In other words, in this specification, the MTC terminal may refer to a newly defined third generation partnership project (3GPP) Release 13 low cost (or low complexity) UE category/type, which executes LTE-based MTC-related operations. Alternatively, in this specification, the MTC terminal may refer to a UE category/type that is defined in or before 3GPP Release-12 that supports the enhanced coverage in comparison with the existing LTE coverage or supports low power consumption or may refer to a newly defined Release 13 low cost (or low complexity) UE category/type.

A wireless communication system according to an embodiment of the present disclosure may be widely installed to provide various communication services, such as voice data, packet data, and the like. The wireless communication system may include a user equipment (UE) and a base station (BS) (or an evolved node B (eNB)). Throughout the specification, a UE may be an inclusive concept indicating a terminal utilized in wireless communication, including a mobile station (MS), a user terminal (UT), a subscriber station (SS), a wireless device, and the like in global systems for mobile communication (GSM) as well as a user equipment (UE) in wideband code division multiple access (WCDMA), long term evolution (LTE), high speed packet access (HSPA), and the like.

A base station or a cell may generally refer to a station that communicates with a UE, and the term "base station" may be interchangeably used with the terms "Node-B," "evolved Node-B (eNB)," "sector," "site," "base transceiver system (BTS)," "access point," "relay node," "remote radio head (RRH)", "radio unit (RU)", "small cell", and the like.

That is, in this specification, the base station or the cell may be construed as an inclusive concept indicating some areas or functions covered by a base station controller (BSC) in code division multiple access (CDMA), a NodeB in WCDMA, an eNB or a sector (site) in LTE, and the like, and the concept may include any of various coverage areas such as a megacell, a macrocell, a microcell, a picocell, a femtocell, communication ranges of a relay node, an RRH, an RU, and a small cell.

A base station controls each of the above various cells. Thus, the base station may be construed in the following two ways: (1) the base station may be an apparatus itself that provides a megacell, a macrocell, a microcell, a picocell, a femtocell, and a small cell in association with a wireless area; or (2) the base station may indicate the wireless area itself. In (1), base stations may be i) all apparatuses that provide a predetermined wireless area and that are controlled by the same entity or ii) all apparatus that cooperate with one another to cooperatively configure a wireless area. Based on the configuration type of the wireless area, an eNB, an RRH, an antenna, an RU, a low power node (LPN), a point, a transmission/reception point, a transmission point, a reception point, and the like may be examples of the base station. In (2), the base station may be the wireless area itself where signals are received or transmitted from the perspective of the UE or a neighboring base station.

Therefore, the megacell, the macrocell, the microcell, the picocell, the femtocell, the small cell, the RRH, the antenna, the RU, the LPN, the point, the eNB, the transmission/reception point, the transmission point, and the reception point are collectively referred to as the base station.

In this specification, the UE and the base station are used as two inclusive transceiving subjects to embody the technology and technical concepts described in this specification and may not be limited to predetermined terms or words. In this specification, the UE and the base station are used as two (uplink or downlink) inclusive transceiving subjects to embody the technology and technical concepts described in this specification and may not be limited to predetermined terms or words. Here, uplink (UL) refers to data transmission and reception from the UE transmits to the base station, and downlink (DL) refers data transmission and reception from the base station to the UE.

There are no restrictions on multiple access schemes applied to wireless communication systems. Multiple access schemes such as CDMA, time division multiple access (TDMA), frequency division multiple access (FDMA), orthogonal frequency division multiple access (OFDMA), OFDM-FDMA, OFDM-TDMA, OFDM-CDMA, and the like may be used. An embodiment of the present disclosure may be applicable to resource allocation in an asynchronous wireless communication scheme that evolves to LTE and LTE-advanced via GSM, WCDMA, and HSPA and in a synchronous wireless communication scheme that evolves to CDMA, CDMA-2000, and Ultra Mobile Broadband (UMB). The present disclosure should not be construed as being restricted or limited to a specific wireless communication field and should be construed as including all technical fields to which the technical spirit of the present invention is applicable.

UL transmission and DL transmission may be performed based on i) a time division duplex (TDD) scheme that performs the transmission based on different times or ii) a frequency division duplex (FDD) scheme that performs the transmission based on different frequencies.

Further, in a system such as LTE and LTE-A, a specification defines configuring of an uplink and a downlink based on a single carrier or a pair of carriers. The uplink and the downlink may carry control information through a control channel such as Physical Downlink Control Channel (PD- CCH), Physical Control Format Indicator Channel (PCFICH), Physical Hybrid ARQ Indicator Channel (PITCH), Physical Uplink Control Channel (PUCCH), Enhanced Physical Downlink Control Channel (EPDCCH), and the like and may carry data through a data channel such as Physical Downlink Shared Channel (PDSCH), Physical Uplink Shared Channel (PUSCH), and the like.

Meanwhile, the uplink and the downlink may carry control information even by using enhanced PDCCH or extended PDCCH (EPDCCH).

In this specification, the cell may refer to i) the coverage of a signal transmitted from the transmission/reception point (or the transmission point), ii) a component carrier having the coverage of the signal transmitted from the transmission/reception point, or iii) the transmission/reception point itself.

A wireless communication system according to embodiments refers to a coordinated multi-point transmission/reception (CoMP) system where two or more transmission/reception points cooperatively transmit the signal, a coordinated multi-antenna transmission system, or a coordinated multi-cell communication system. The CoMP system may include at least two multi-transmission/reception points and terminals.

Each of the multi-transmission/reception points may be i) a base station or ii) a macrocell (hereinafter, referred to as an eNB) and at least one RRH that has high transmission power or low transmission power within a macrocell area and that is connected to an eNB through an optical cable or an optical fiber and wiredly controlled.

Hereinafter, a downlink refers to communication or a communication path from a multi-transmission/reception point to a terminal, and an uplink refers to communication or a communication path from a terminal to a multi-transmission/reception point. In the downlink, a transmitter may be a part of the multi-transmission/reception point, and a receiver may be a part of the terminal. In the uplink, a transmitter may be a part of the terminal, and a receiver may be a part of the multi-transmission/reception point.

Hereinafter, signal transmission and reception through a channel such as PUCCH, PUSCH, PDCCH, EPDCCH, and PDSCH may be described through the expression "PUCCH, PUSCH, PDCCH, EPDCCH, and PDSCH are transmitted or received."

In addition, hereinafter, the expression "PDCCH is transmitted or received" or "the signal is transmitted or received through PDCCH" includes "EPDCCH is transmitted or received" or "the signal is transmitted or received through EPDCCH."

That is, a physical downlink control channel used herein may indicate PDCCH or EPDCCH and may indicate both of the PDCCH and the EPDCCH.

Also, for convenience of description, according to an embodiment of the present disclosure, EPDCCH may be applied to a part described using PDCCH, and PDCCH may be applied to a part described using EPDCCH.

Meanwhile, higher layer signaling, which will be described below, includes radio resource control (RRC) signaling that carries RRC information including RRC parameters.

An eNB performs downlink transmission to terminals. The eNB may transmit PDSCH, which is a primary physical channel for unicast transmission, and may transmit PDCCH for carrying downlink control information such as scheduling required for reception of the PDSCH and scheduling approval information for transmission of an uplink data channel (e.g., PUSCH). Hereinafter, transmission and reception of signals through each channel may be described as transmission and reception of a corresponding channel.

New radio (NR) is recently discussed in the 3GPP. A representative usage scenario of NR may be enhanced Mobile BroadBand (eMBB), massive Machine Type Communication (mMTC), and Ultra Reliable and Low Latency Communication (URLLC).

In this specification, a frequency, a frame, a sub-frame, resources, resource blocks, a region, a band, a sub-band, a control channel, a data channel, a synchronization signal, various kinds of reference signals, various kinds of signals, and various kinds of messages which are associated with the NR may be interpreted with various meanings in the past, at present, or in the future.

For example, in the present specification, the LTE and the NR refer to different radio access technologies. A new radio access technology, which is being discussed in 3GPP Release 15, is described as the NR. The NR may have various differences from the LTE in terms of a frame structure, a channel, a core network technology, and the like. Various functions for wireless transmission, high-speed transmission, and large-scale data transmission in high bands may be added to the NR.

Hereinafter, for convenience of description, the typical radio access technology will be described as the LTE, and a new radio access technology being discussed in the 3GPP will be described as the NR. Also, the base station may be an eNB using the LTE technology and also may be a gNodeB (gNB) using the NR technology, which will be separately described as necessary.

Also, the term "cell" in this specification is comprehensively used to cover a wireless path, a wireless link, a carrier, and the like for carrying data. One base station may transmit and receive data through a plurality of cells. Alternatively, the terminal may transmit and receive data using a plurality of cells by means of cells controlled by two base stations. In the following description, a case in which one base station controls a plurality of cells is referred to as carrier aggregation, and a case in which a plurality of cells, which are controlled by two or more base stations, are used is referred to as dual connectivity.

Further, a base station or a 5G gNB in this specification may be described as including a central unit and a distributed unit. For example, a 5G radio access network may be divided into a centralized unit that is centrally installed and a distributed unit that is distributed over a cell site. As necessary, the base station will be described as including both of a central unit and a distributed unit connected through a fronthaul interface and thus including a network function of the central unit and a network function of the distributed unit. Alternatively, the base station may includes a central unit, a distributed unit, and an RU responsible for a radio frequency (RF) function.

In this specification, the terms "central unit" and "distributed unit" are arbitrarily selected based on locations of the corresponding units for convenience of description, and embodiments of the present disclosure are not limited thereto. For example, the central unit and the distributed unit may have different locations and functions depending on a wireless network building scenario or the like. Also, the name of each unit may vary depending on a manufacturer which manufactures a corresponding unit. Accordingly, the central unit in this specification should be understood as having various names such as a data processing unit, a station unit, a center station unit, and a virtualization server. Likewise, the distributed unit should be understood as having various names such as a cell site unit, a radio unit, and an end unit. That is, the central unit and the distributed unit in this specification refer to individual units which perform individual base station functions and to which the base station functions are distributed, and there is no limitation on their names.

In addition, a fronthaul interface is used to refer to an interface between the central unit and the distributed unit and may be understood as being distinguished from a backhaul interface, which is an interface between a core network and the central unit. It will be appreciated that the fronthaul interface, which is an arbitrary term distinguishable from the backhaul interface, refers to an interface for connecting the central unit and the distributed unit. The fronthaul interface may be described as an F1 interface. That is, there is no limitation on its name.

In addition, an E1 interface refers to an interface for delivering data between nodes that are physically or logically separated from one another inside the central unit. For example, the E1 interface is an interface for exchanging data between a control plane logic node and a user plane logic node, which will be described below, and a protocol for the E1 interface may be described as E1AP. It will be appreciated that the E1 interface is an arbitrary term and thus various terms, such as a C1 interface, which are distinguishable from the fronthaul interface and the backhaul interface, may be used. There is no limitation on its name.

In the following description, 5G or a 5G communication scheme should be understood as a generic term for a communication scheme on which research is being conducted to transmit a larger amount of data at higher transmit rate than the LTE-Advanced. That is, the 5G may refer to a specific communication scheme or may refer to some functions or the entire communication system for large-scale high-speed data communication. Therefore, the 5G in this specification should be understood to mean a communication system or a communication function for performing large-capacity high-speed communication.

In addition, the names of messages, units, nodes, interfaces, protocols, and the like to be described below are for convenience of description, and thus there is no limitation on the names.

A typical LTE radio base station may be separated into a data unit (DU) for processing a digital function of baseband and an RU for processing an RF function. The DU is usually installed in a center station and configured to perform physical layer (PHY), medium access control (MAC), radio link control (RLC), packet data convergence protocol (PDCP), and RRC functions, and the RU is installed in a cell site and configured to perform an RF function. The DU and the RU are connected to each other through a Common Public Radio Interface (CPRI)-based interface, but since the standardization of the interface between DU and RU is incomplete, it is difficult to ensure compatibility between different equipment manufacturers, and thus there are many limitations on the building and operating of the base station. Also, a typical DU is not virtualized and thus has very low operating efficiency.

However, the next generation radio access technology named "5G" is expected to require a large number of small cell base stations in order to stably provide various services and satisfy requirements such as a high frequency band, a high transmission rate, high reliability, and low latency. To this end, there is a need to virtualize the inside of the base station and to design an interface between internal nodes to be a standards-based open interface.

In accordance with this need, the present disclosure is intended to provide a detailed wireless protocol procedure for managing a control operation and also managing radio resources based on an interface between units or internal nodes constituting a gNB using the next-generation radio access technology.

FIG. 1 illustrates a fronthaul interface and a separation configuration structure of a gNB according to an embodiment.

Referring to FIG. 1, a 5G radio access network (RAN or Next Generation RAN (NG-RAN)) (hereinafter referred to as a gNB) may mainly include a central unit (CU) 100 installed in a station and DUs 110 and 120 installed in a respective cell site. In this case, an RF or antenna function may be included in, or separated from, the DUs 110 and 120. When the function is separated from the DUs 110 and 120, the gNB may includes the CU 100, the DUs 110 and 120, and a radio frequency unit (RFU) (RF/antenna).

Hereinafter, an interoperable interface between fronthaul structures of the DUs 110 and 120 and the CU 100 configured inside the 5G gNB is referred to as a fronthaul interface or F1. For example, a control plane interface is referred to as F1-C, and a user plane interface is referred to as F1-U. Also, as necessary, a fronthaul is referred to as Midhaul. As described above, these terms are for convenience of description and ease of understanding and thus may be replaced by other terms having corresponding functions.

That is, the CU 100 of the gNB may be associated with one or more DUs 110 and 120. Also, the CU 100 and the DUs 110 and 120 may be manufactured or operated by different vendors. Alternatively, the CU 100 and the DUs 110 and 120 may be manufactured or operated by the same vendor. For example, the CU 100 may be manufactured or operated by vendor C, the DU 110 may be manufactured or operated by vendor A, and the DU 120 may be manufactured or operated by vendor B. Even in these cases, for the CU 100 and the DUs 110 and 120, a control plane interface may be configured through F1-C, and a user plane interface may be configured through F1-U.

Also, one CU 100 may be connected to one or more DUs 110 and 120, and DUs 110 and 120 may be connected to one CU 100 or several CUs.

Meanwhile, a CU ID and a DU ID, each of which is a unique identifier, may be used to identify the CU 100 and the DUs 110 and 120. For example, the CU ID and DU ID may have different lengths.

For example, it is necessary to distinguish between different types of CU 100 and DUs 110 and 120. For example, the CU 100 and the DUs 110 and 120 may be classified through values of NG-RAN Split ID or CU Type ID and DU Type ID. For example, the NG-RAN Split ID with a value of 1 may indicate a PDCP-RLC separation structure, and the NG-RAN Split ID with a value of 2 may indicate a MAC-PHY separation structure. In this way, the functions or types of the CU 100 and the DUs 110 and 120 constituting the gNB may be distinguished through corresponding identification information.

For another example, the CU Type ID with a value of 1 indicates inclusion of layers higher than PDCP, and the DU Type ID with a value of 1 indicates inclusion of layers lower than RLC. In this way, type identification information for identifying a function configured for each unit may be set.

When one DU can be connected to a plurality of CUs, a CU Group ID (or a CU Pool ID) may be used. For example, the CU Group ID with a value of 1 may indicate a virtual set (a CU group) of CU devices with CU ID #1, CU ID #3, and CU ID #4. Also, among the CUs belonging to the CU group, one CU responsible for connection to and control of a UE or a DU may be designated as a master CU, and the other CUs may be designated as slave CUs. For example, the master CU and the slave CUs may be statically or dynamically allocated or changed for the purposes of gNB building, load distribution, failure handling, and the like.

A wireless cell may include one DU or two or more DUs. Cells with large coverage configured in this way may be suitable for UEs with high mobility and may be useful for building wide area cells for marine vessels, high-speed trains, subways, drones, airplanes, and so on.

In the present disclosure, a case in which the gNB includes a CU and DUs as shown in FIG. 1 will be mainly described.

Figure 2:
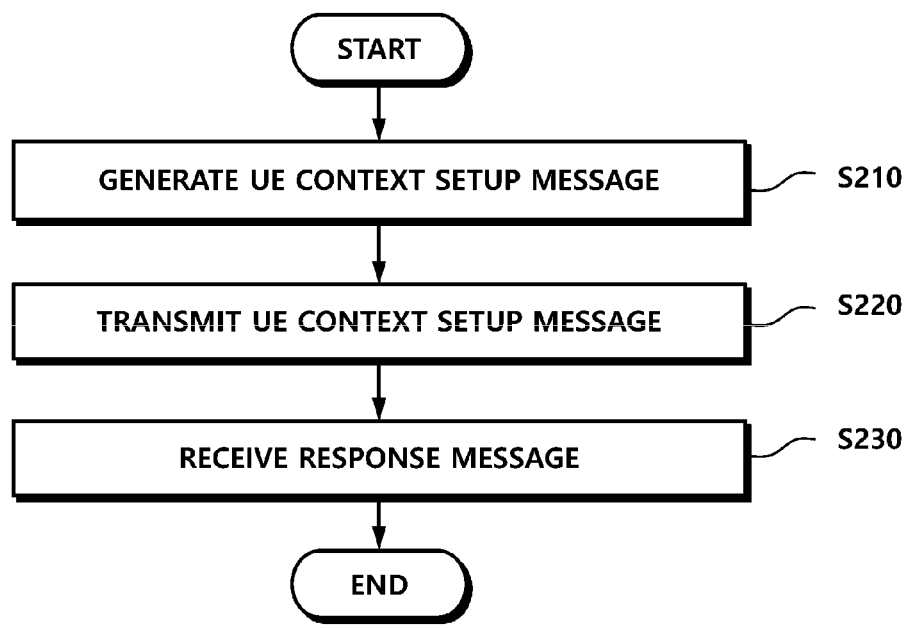
FIG. 2 illustrates operation of a central unit of a base station according to an embodiment.

FIG. 2 illustrates operation of a CU of a gNB according to an embodiment.

Referring to FIG. 2, a CU may create a UE context setup message to be transmitted to one or more DUs associated with the CU (S210).

For example, the CU and the DUs constitute a gNB and may be installed and operated at places that are physically separated from each other. Also, the CU may be configured to perform at least one of RRC, PDCP, RLC, and MAC network functions, and the DU may be configured to perform at least one of RLC, MAC, and PHY network functions. Alternatively, the CU may be configured to perform PDCP, Service Data Adaptation Protocol (SDAP), and RRC functions, and the DU may be configured to perform RLC, MAC, and PHY functions. That is, the CU and the DU may be configured to perform the functions on a functional layer basis.

The CU may transmit the UE context setup message to the one or more DUs through a fronthaul interface (S220). For example, the CU may transmit a message for setting resources to the DUs through an F1 interface established between the CU and the DUs. To this end, the CU may transmit the UE context setup message to the DUs.

For example, the UE context setup message may include signaling radio bearer (SRB) and data radio bearer (DRB) configuration information and may be transmitted using the F1 Application Protocol (F1AP). The F1AP refers to a protocol for transmitting and receiving data using the F1 interface. Also, the UE context setup message may further include at least one of secondary cell list information, Discontinuous Reception (DRX) cycle information, uplink configuration information, SRB list information, and uplink General Packet Radio Service (GPRS) Tunneling Protocol (GTP) tunnel end point information. For example, the secondary cell list information may include identification information of cells to be added to a UE as secondary cells. Thus, the UE may form a carrier aggregation or dual connectivity. The DRX cycle information may be composed of one or more DRX cycle values to be applied to the UE. The uplink configuration information may include parameters, bearer information, or the like that should be configured in the UE in order for the UE to transmit uplink data. The SRB list information may include identification information of SRBs. The uplink GTP tunnel end point information includes information regarding an endpoint at a transmitting or receiving side when uplink data is transmitted or received through a GTP tunnel.

The CU may further include at least one piece of the above-described information in overall consideration of information regarding the UE's capability, a need for configuration of the carrier aggregation or dual connectivity, a need for configuration of the GTP tunnel, and the like.

The CU may receive a response message for the UE context setup message from the one or more DUs through the fronthaul interface (S230). For example, each DU may set context of the corresponding UE therein on the basis of the UE context setup message received from the CU.

For example, when the DU successfully sets SRBs or DRBs of the UE context setup message, the CU may receive a UE context setup response message including at least one of list information for DRBs of which setting was successful by the DU, list information for DRBs of which setting failed, failure cause information, and information regarding SRBs of which setting failed.

For another example, when the DU may be unable to set UE context of the UE context setup message, the CU may receive a UE context setup failure message including the failure cause information.

For still another example, when the DU may be unable to set either the SRBs or the DRBs included in the UE context setup message, the CU may receive a UE context setup failure message including the failure cause information.

As described above, when the UE context setup message (a UE context setup request message) is transmitted, the CU may receive the UE context setup response message or the UE context setup failure message depending on a result of processing by the DU.

Thus, the CU and the DU may perform a resource setting process for communication and share information regarding whether resources are successfully set through the fronthaul interface.

Meanwhile, as described above, 5G baseband functions are largely implemented in a virtualization method using PHY, MAC, RLC, PDCP, SDAP, RRC radio protocol layers or Radio Access Network Function (RANF), and the functions of higher layer protocols and lower layer protocols may be appropriately allocated to the CU and the DU. It will be appreciated that detailed RANF functions may be performed differently.

A configuration of the gNB to which these embodiments can be applied will be described below in detail with reference to the accompanying drawings.

Figure 3:
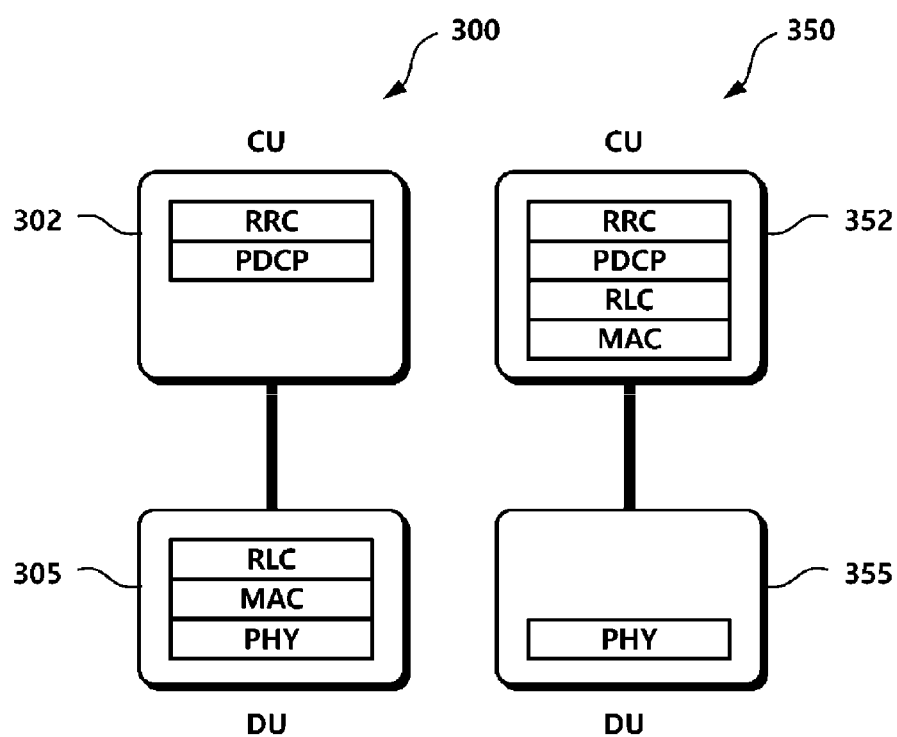
FIG. 3 illustrates a base station configuration composed of a central unit and a distributed unit according to an embodiment.

FIG. 3 illustrates a configuration of a gNB including a CU and a DU according to an embodiment.

A CU and a DU constituting the gNB may have various types. Referring to FIG. 3, for a first-type gNB 300, a CU 302 may is configured to perform RRC and PDCP network functions and a DU 305 may be configured to perform RLC, MAC, and PHY network functions to form a separation structure. Alternatively, for a second-type gNB 350, a CU 352 may be configured to perform RRC, PDCP, RLC, and MAC network functions, and a DU 355 may be configured to perform only a PHY network function. In addition, as necessary, some functions allowing non-real-time processing of RLC or MAC may be distributed to the CU, and some functions requiring real-time processing may be distributed to the DU.

As described above, the CUs 302 and 353 may be configured to perform at least one of RRC, PDCP, RLC, and MAC network functions, and the DUs 305 and 355 may be configured to perform at least one of RLC, MAC, and PHY network functions. Alternatively, for an integrated device having an RF module and an antenna built therein, the RF module may also be included in the DU. Accordingly, in addition to the first-type gNB 300 and the second-type gNB 350, it is possible to implement various gNB separation structures. For example, RLC and MAC layers have similar packet processing functions, such as packet concatenation (multiplexing, assembling, etc.), packet segmentation (de-multiplexing, etc.), packet reordering, and packet retransmission. Thus, in order to perform packet processing with high performance, the layers may be integrated into a single layer, or the similar functions may be combined with each other. Alternatively, as necessary, specific network functions may be removed or may not be used.

The gNB separation structure may be configured in various ways as needed.

For example, the first-type gNB 300 facilitates interoperation with 5G and LTE/WiFi gNB equipment through PDCP and thus may be appropriate as an mmWave gNB for broadband transmission. The second-type gNB 350 allows short transmission latency and fast radio resource scheduling but needs large-scale fronthaul data transmission, and thus may be appropriate for a gNB using frequencies of 6 GHz or less.

Meanwhile, a radio resource management (RRM) function may be added to the DUs 305 and 355 for the purpose of separately supporting mobility or the like. Alternatively, a network function corresponding to an RAN control plane (CP) (e.g., RRC) may be distributed to the CUs 302 and 352 and the DUs 305 and 355.

Figure 4:
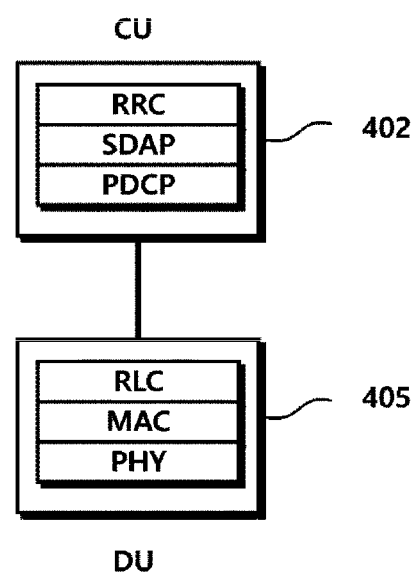
FIG. 4 illustrates a base station configuration including a central unit and a distributed unit according to another embodiment.

FIG. 4 illustrates a configuration of a gNB including a CU and a DU according to another embodiment.

Referring to FIG. 4, for the gNB, a CU 402 is configured to perform RRC, SDAP, and PDCP network functions, and a DU 405 is configured to perform RLC, MAC, and PHY network functions. For example, the SDAP may perform a function of converting 5G Quality of Service (QoS) flows received from a 5G core network into a radio bearer processable by the gNB and may selectively operate as needed.

The SDAP may perform a function of converting 5G QoS flows received from a 5G core network into a radio bearer processable by the gNB and may selectively operate as needed.

In particular, an RLC layer and a MAC layer have similar packet processing functions such as packet concatenation (multiplexing, assembling, etc.), packet segmentation (demultiplexing, etc.), packet reordering, and packet retransmission. Thus, in order to perform high performance packet processing, the layers may be integrated into a single layer, or similar functions may be combined with each other. Alternatively, specific functions may be removed or may not be used as a concatenation function is not performed in the RLC layer. The CU 402, which is centralized, may be designed as a software module virtualized on general-purpose large-scale/high-performance gNB hardware. All or some functions of the RRM may be distributed to only the CU 402 or to both the CU 402 and the DU 405.

An O&M function device (gNB-OM) for operating and managing the gNB may be separately installed and may be connected to both of the CU 402 and the DU 405 for the purpose of heterogeneous vendor interoperability between the CU 402 and the DU 405. Alternatively, the O&M function device (gNB-OM) may be connected to either the CU 402 or the DU 405 and may interoperate with the unconnected device through a CU-DU control interface.

As described above, the open fronthaul interface F1 is a point-to-point logical interface between a CU and a DU and performs signaling information exchange and data transfer. User plane (UP) data may be transmitted through a GTP-U/UDP transmission protocol, and an F1AP message may be transmitted through a transmission protocol such as Stream Control Transmission Protocol (SCTP). In the present disclosure, a case in which PDCP, SDPA, and RRC functions are distributed to the CU and the other functions are distributed to the DU will be described as an example. However, the function distribution between the CU and the DU may be designed in different forms, and the description of this embodiment may be applied as it is within the same technical spirit.

Meanwhile, a resource release operation needs to be defined in the same manner as the resource setup operation in terms of resource management. A UE context release operation performed between a CU and a DU will be described below.

Figure 5:
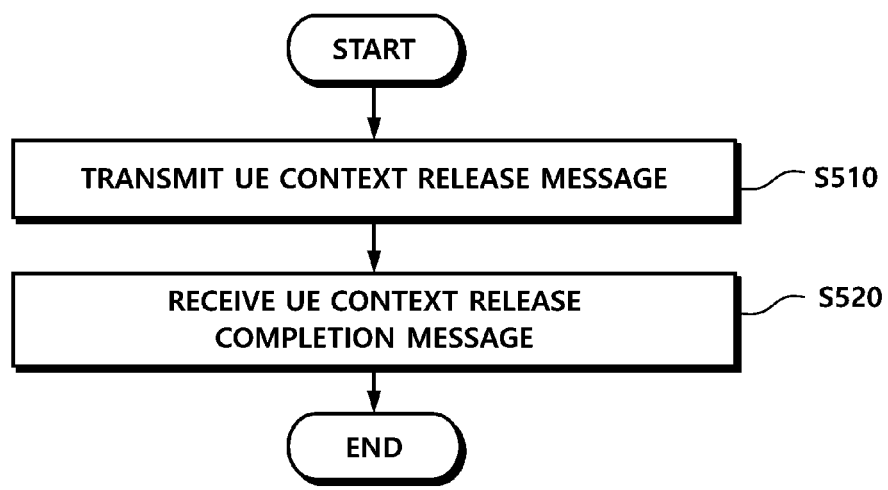
FIG. 5 illustrates operation of a central unit for releasing UE context according to an embodiment.

FIG. 5 illustrates operation of a CU for releasing UE context according to an embodiment.

Referring to FIG. 5, the CU may transmit a UE context release command message to the DU in order to release a UE-associated logic connection (S510). For example, when UE context setup is completed or when communication is performed after the completion, the CU may need to allow the DU to release all logic connections with the UE.

In this case, the CU may transmit the UE context release command message to the DU through the above-described F1 interface. When the UE context release command message is received, the DU may perform an operation of releasing all signaling and user data transmission resources. For example, the DU may release all of SRBs and DRBs for the corresponding UE.

The CU may receive a response message for the UE context release command from the DU (S520). When the DU releases all signaling and user data transmission resources for the corresponding UE through the above-described operation and the release is successfully completed, the CU may receive a UE context release completion message from the DU.

On the other hand, when the DU does not complete the release operation of the corresponding UE according to the UE context release command message, the CU may receive the UE context release failure message, which includes a cause of the failure and state information.

The messages in operations S510 and S520 may be transmitted through a fronthaul interface (e.g., the F1 interface) between all the CUs and the DUs.

As described above, realistically, 5G communication providers are likely to optimally build and operate various types of 5G gNBs of various equipment manufacturers depending on wireless data traffic/coverage demands, equipment prices, and cell site environments. Also, when a gNB using a millimeter-wave frequency is used, there is a burden that a large number of small cells should be built by a provider. Therefore, in order to secure flexibility through multi-vendor compatibility, there is a need to standardize the fronthaul interface to be an open interface as described above. To this end, the above-described operations of the CU and the DU should be performed.

The CU, which is centralized, may be designed as a software module virtualized on general-purpose large-scale/high-performance gNB hardware.

Figure 6:
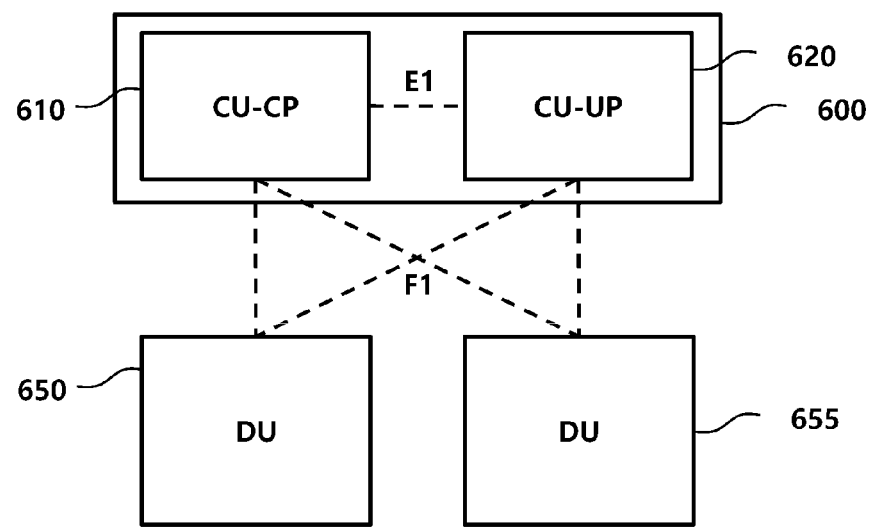
FIG. 6 is a conceptual view of a central unit including a control plane node and a user plane node according to an embodiment.

FIG. 6 is a conceptual view of a central unit including a control plane node and a user plane node according to an embodiment.

Referring to FIG. 6, a CU 600 may include a control plane logic node 610 and a user plane logic node 620. There may be one or more control plane logic nodes 610 and one or more user plane logic nodes 620, and the control plane logic nodes 610 and the user plane logic nodes 620 may be physically separated from one another as well as being provided as logic nodes.

For example, the CU 600 of the gNB may be virtualized by being configured into a CU-CP node 610 responsible for the control plane (CP) and a CU-UP node 620 responsible for the user plane (UP). Thus, it is possible to efficiently operate a plurality of CU-UP nodes 620 processing a large amount of data at low cost by using a smaller number of CU-CP nodes 610. The CU-CP node 610 and the CU-UP node 620 may be connected through an internal E1 interface of the CU 600 to share data. The open internal interface E1 of the CU 600, which is a point-to-point logical interface between the CU-CP node 610 and the CU-UP node 620, may exchange signaling information through an E1-C interface and perform data transfer through an E1-U interface. Also, user plane (UP) data may be transmitted through a GTP-U/UDP transmission protocol, and an E1 Application Protocol (E1AP) message may be transmitted through a transmission protocol such as SCTP.

In addition, each of the CU-CP node 610 and the CU-UP node 620 may be connected to one or more DUs 650 and 655 through the above-described fronthaul interface.

Figure 7:
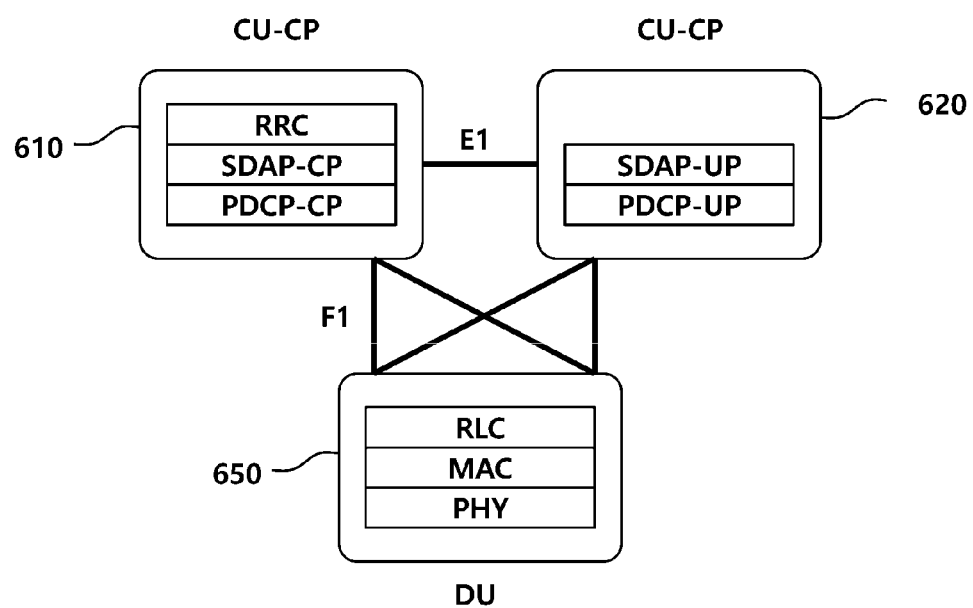
FIG. 7 is a diagram for describing functions of a central unit, which are classified depending on a control plane node and a user plane node according to an embodiment.

FIG. 7 is a diagram for describing functions of a CU which are classified depending on the control plane node and the user plane node according to an embodiment.

Referring to FIG. 7, the CU-CP node 610 may be configured to perform RRC, a control plane function of PDCP (PDCP-CP), and a control plane function of SDAP (SDAP-CP), and the CU-UP node 620 may be configured to perform a user plane function of PDCP (PDCP-UP) and a user plane function of SDAP (SDAP-UP). In this case, CP functions of PDCP and SDAP may be removed or included in the RRC.

Alternatively, all or some functions of the RRM may be configured in only the CU-CP node 610 or in both of the CU-CP node 610 and the CU-UP node 620. Alternatively, all or some functions of the RRM may be distributed to both of the CU 600 and the DU 650.

As described above, the CU-CP node 610 and the CU-UP node 620, which are separated from each other, may interoperate with each other through an open internal interface of the CU 600 (namely, an E1 interface) in order to secure equipment interoperability.

Also, 1) CU Split ID or 2) CU-CP Type ID and CU-UP Type ID are assigned to the CU-CP node 610 and the CU-UP node 620 in use to distinguish the types thereof. Thus, it is possible to perform classification. For example, CU Split ID having a value of 1 indicates RRC/PDCP-CP/SDAP-CP and PDCP-UP/SDAP-UP separation structure, and CU Split ID having a value of 2 indicates an RRC-PDCP/SDAP separation structure.

Alternatively, CU-CP Type ID having a value of 1 may indicate inclusion of a RRC/PDCP-CP/SDAP-CP function, and CU-UP Type ID having a value of 1 may indicate inclusion of a PDCP-UP/SDAP-UP function.

The CU-CP ID and the CU-UP ID, each of which is a unique identifier, may be used to identify the CU-CP node 610 and the CU-UP node 620. The CU-CP node 610 and the CU-UP node 620 may have the same length or different lengths.

A process of setting resources through the E1 interface will be described as an example. The control plane logic node 610 may deliver, to the user plane logic node 620, a bearer context setup request message for instructing the user plane logic node 620 to set bearer context.

In response to the message, when the setting of the bearer context is successful, the user plane logic node 620 may deliver a bearer context setup response message to the control plane logic node 610 through the E1 interface. On the other hand, when the setting of the bearer context fails, the user plane logic node 620 may deliver a bearer context setup failure message to the control plane logic node 610 through the E1 interface.

As described above, the CU may perform the process of setting resources using the DU and the fronthaul interface, and a control plane node and a user plane node inside the CU may transmit and receive data for the resource setting process through the internal interface of the CU. In this specification, the nodes inside the CU are assumed to be logic nodes, but each node may be physically separated from one another. Even in this case, the description of this embodiment may be applied as it is. Accordingly, the term "logic node" does not mean that a corresponding node is necessarily logically configured, but should be understood as a conceptual term including all logical/physical distinctions.

Here, the above-described operation of the CU will be described in detail on a message basis or on an embodiment basis. That is, a protocol procedure for radio resource management of a DU through an F1-C interface and a protocol procedure for resource management of a CU-UP through an E1-C interface will be described in detail in respective embodiments.

1. Procedure for Setting Up Radio Resources in DU

The radio resource management procedure for a DU may include registration, release, setup, configuration, change, reporting, and deletion functions for a DU device controlled by a CU and for radio resources associated with the DU device. For example, the radio resources may include cell information/parameters such as a cell identifier, beam information/parameters such as a beamforming identifier, channel information/parameters, gNB self-organizing network (SON)-associated parameters, and the like. In particular, the radio resources may include a frequency, antenna information, RF output, DU power consumption, etc. which are supported by the DU and may include system information and paging information related to MIB and SIB.

Various embodiments of the above-described setup success and failure processes for radio resources will be described below with reference to the accompanying drawings. In particular, UE context associated with radio resources will be described as an example, but the above-described various radio resources may be applied as they are.

Figure 8:
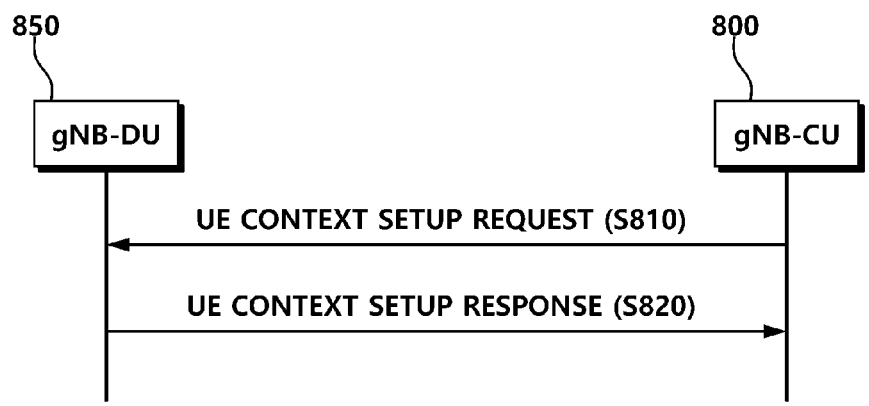
FIG. 8 is a signal diagram illustrating a process of processing a UE context setup message in case of success of setup according to an embodiment.

FIG. 8 is a signal diagram illustrating a process for processing a UE context setup message in case of success of setup according to an embodiment.

Referring to FIG. 8, a CU 800 may transmit a UE context setup request message for setting up UE context to a DU 850 (S810). The UE context setup request message may include information for setting UE context in the DU 850 and may include SRB and DRB configuration information. Also, as necessary, the UE context setup request message may further include at least one of secondary cell list information, DRX cycle information, uplink configuration information, SRB list information, and uplink GTP tunnel end point information.

In operation S810, when a UE context setup request is received, the DU 850 may set and configure the received UE context setup request therein.

For example, when the DU 850 successfully sets SRBs or DRBs of the UE context setup request message, the DU 850 may transmit, to the CU 800, a UE context setup response message including at least one of list information for DRBs of which setting was successful, list information for DRBs of which setting failed, failure cause information, and information regarding SRBs of which setting failed (S820).

The series of processes may be performed through the F1 interface.

Figure 9:
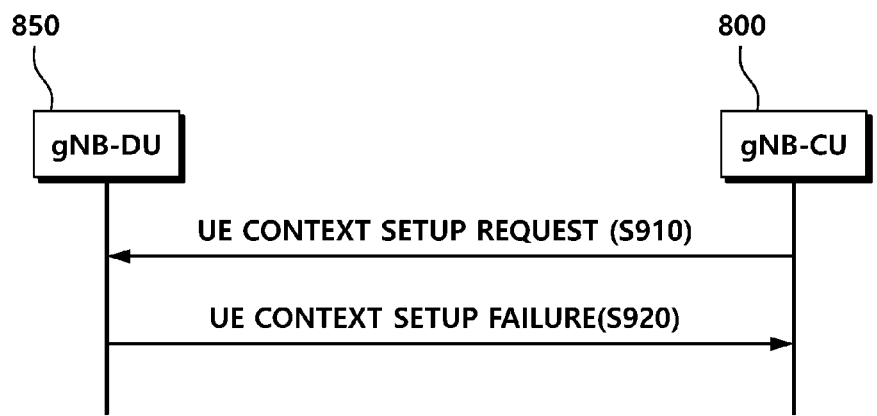
FIG. 9 is a signal diagram illustrating a process of processing a UE context setup message in case of failure of setup according to an embodiment.

FIG. 9 is a signal diagram illustrating a process of processing a UE context setup message in case of failure of setup according to an embodiment.

Referring to FIG. 9, the CU 800 may transmit a UE context setup request message for setting up UE context to the DU 850 (S910). As shown in FIG. 8, the UE context setup request message may include information for setting UE context in the DU 850 and may include SRB and DRB configuration information. Also, as necessary, the UE context setup request message may further include at least one of secondary cell list information, DRX cycle information, uplink configuration information, SRB list information, and uplink GTP tunnel end point information.

In operation S910, when a UE context setup request is received, the DU 850 may attempt to set and configure the received UE context setup request therein.

For example, when the DU 850 may be unable to set UE context of the UE context setup request message or when the DU 850 may be unable to set either the SRBs or the DRBs in the UE context setup request message as targets to be set, the DU 850 may transmit a UE context setup failure message including failure cause information to the CU 800 (S920).

The series of processes may be performed through the F1 interface.

Figure 10:
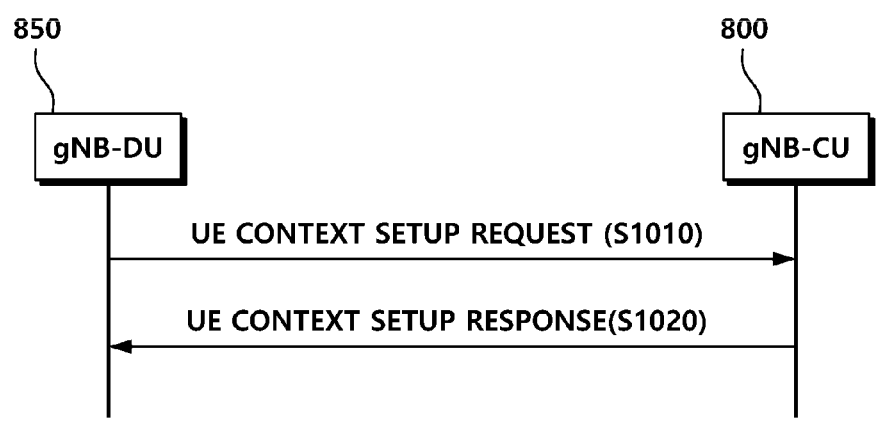
FIG. 10 is a signal diagram illustrating a distributed-unit-initiated UE context setup process according to an embodiment.

FIG. 10 is a signal diagram illustrating a distributed-unit-initiated UE context setup process according to an embodiment.

Referring to FIG. 10, the DU 850 may need to transmit a setup request to the CU 800. For example, when UE context is changed or when there is a change in radio resources, the DU 850 may make a request to the CU 800.

For example, the DU 850 may transmit a request message for requesting UE context setup to the CU 800 (S1010). The CU 800 may check the request message and then transmit, to the DU 850, a response message including a result for the UE context setup request (S1020).

The above-described procedures of FIG. 8 to FIG. 10 may also be applied to radio resource information, such as a specific cell or beam controlled by the DU 850, as well as the UE context.

For example, in order to request that the DU 850 should transmit the radio resource information, such as a specific cell or beam controlled by the DU 850, the CU 800 may set up or release the request by transmitting a DU RADIO RESOURCE SETUP message to the DU 850. The DU 850 may inform the CU 800 of radio resource information reported by the UE through an RRC message by transmitting a DU RADIO RESOURCE RESPONSE message to CU 800. However, when the response is unnecessary, the corresponding response message may be omitted.

On the other hand, when the DU 850 fails to respond to the DU RADIO RESOURCE SETUP message, the DU 850 may inform the CU 800 of the failure by transmitting a DU RADIO RESOURCE FAILURE message to the CU 800. However, when the response is unnecessary, the corresponding response message may be omitted.

This process may be performed through the F1-C interface. When the CU 800 is divided into plane nodes, the CU 800 may be replaced by the CU-CP node.

Also, as shown in FIG. 10, when the DU 850 reports radio resource information to the CU 800 as needed or when there is a need for a setup request, the DU 850 may transmit a DU RADIO RESOURCE SETUP message to the CU 800 and receive a response to the message. That is, the CU 800 may not transmit a response message to the DU 850.

2. Procedure for Changing Radio Resources of DU

The CU needs to change or reconfigure radio resources of the DU. To this end, a specific protocol is also required.

Figure 11:
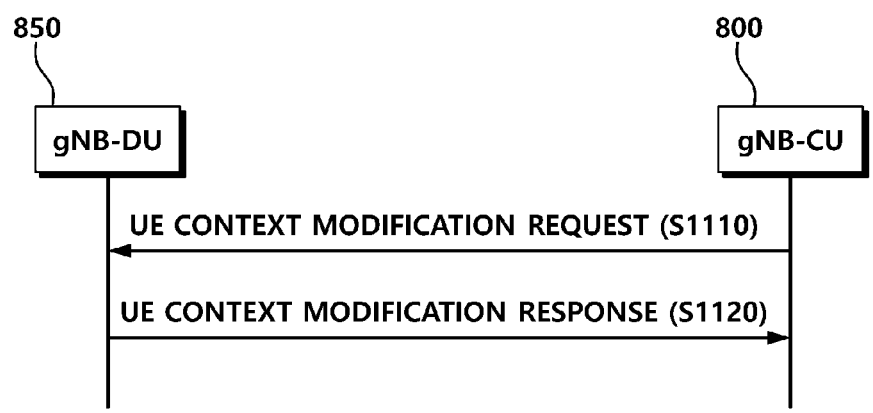
FIG. 11 illustrates a process of processing a UE context modification message in case of success of modification according to an embodiment.

FIG. 11 illustrates a process of processing a UE context modification message in case of success of modification according to an embodiment.

Referring to FIG. 11, the CU 800 may transmit a UE context modification request message for modifying or reconfiguring UE context set in the DU 850 (S1110). The DU 850 may check the received UE context modification request message and may modify or reconfigure UE context indicated by the corresponding modification request message. To this end, the UE context modification request message may include information for indicating UE context to be modified, information regarding modified UE context information, etc.

When the modification of the UE context is successful, the DU 850 transmits a UE context modification response message including information indicating the success to the CU 800 (S1120).

The series of processes may be performed through the F1-C interface.

Figure 12:
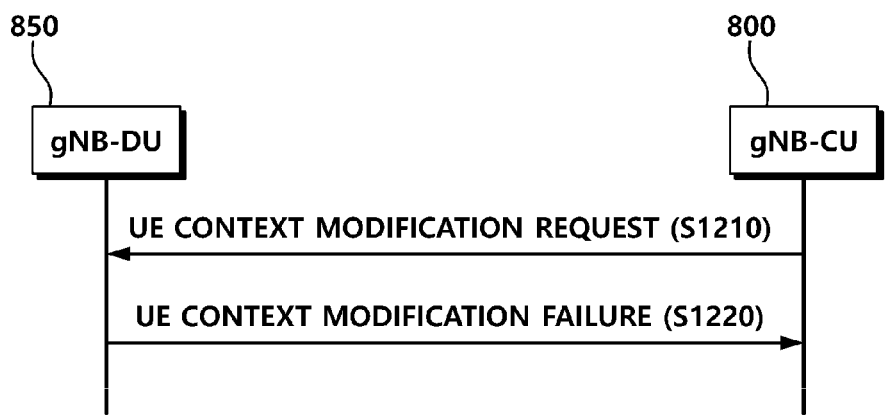
FIG. 12 illustrates a process of processing a UE context modification message in case of failure of modification according to an embodiment.

FIG. 12 illustrates a process of processing a UE context modification message in case of failure of modification according to an embodiment.

Referring to FIG. 12, the CU 800 may transmit a UE context modification request message for modifying or reconfiguring UE context set in the DU 850 (S1210). The DU 850 may check the received UE context modification request message and may attempt to modify or reconfigure UE context indicated by the corresponding modification request message. To this end, the UE context modification request message may include information for indicating UE context to be modified, information regarding modified UE context information, etc.

When the modification or reconfiguration of the UE context fails for any reason, the DU 850 may inform the CU 800 of the failure by transmitting a UE context modification failure message including failure cause information (S1220).

In addition, like the UE context modification process, the CU 800 transmits a DU RADIO RESOURCE MODIFY message to the DU 850 in order to request that the DU 850 should reconfigure or change radio resource information such as a specific cell or beam controlled by the DU 850.

The DU 850 may inform the CU 800 that the modification of the radio resources is successful by transmitting a DU RADIO RESOURCE MODIFY RESPONSE message to the CU 800. However, when the response is unnecessary, the corresponding response message may be omitted.

On the other hand, when the DU 850 fails to process a request corresponding to the DU RADIO RESOURCE MODIFY message, the DU 850 informs the CU 800 of the failure by transmitting a DU RADIO RESOURCE MODIFY FAILURE message to the CU 800. Likewise, when the response is unnecessary, the corresponding response message may be omitted.

Here, when the CU 800 is divided into the above-described control plane node and user plane node, the CU 800 may be replaced by the CU-CP node.

3. Procedure of Releasing Radio Resources of DU

The CU needs to release radio resources configured or set in the DU.

Figure 13:
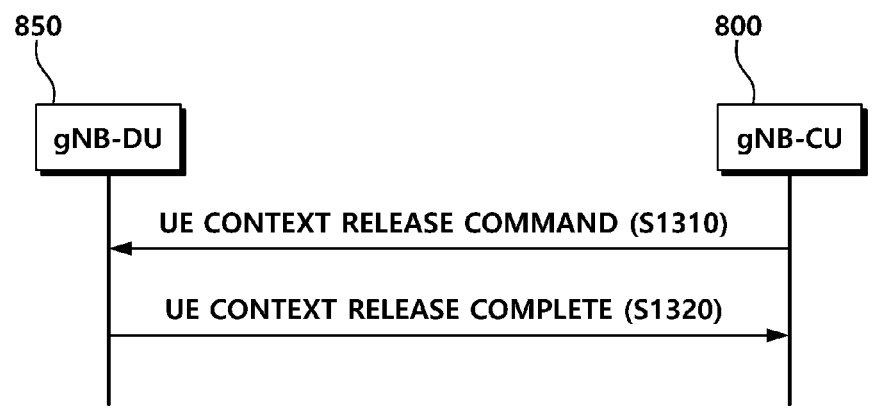
FIG. 13 illustrates a process of processing a UE context release message in case of success of release according to an embodiment.

FIG. 13 illustrates a process of processing a UE context release message in case of success of release according to an embodiment.

Referring to FIG. 13, the CU 800 may transmit, to the DU 850, a UE context release command message for releasing UE context configured in the DU 850 (S1310). For example, the CU 800 may transmit the UE context release command message in order to release a UE-associated logic connection.

When the UE context release command message is received, the DU 850 performs an operation of releasing all signaling and user data transmission resources for a corresponding UE. When the corresponding context is released through this process, the DU 850 transmits a UE context release completion message to the CU 800 (S1320).

Figure 14:
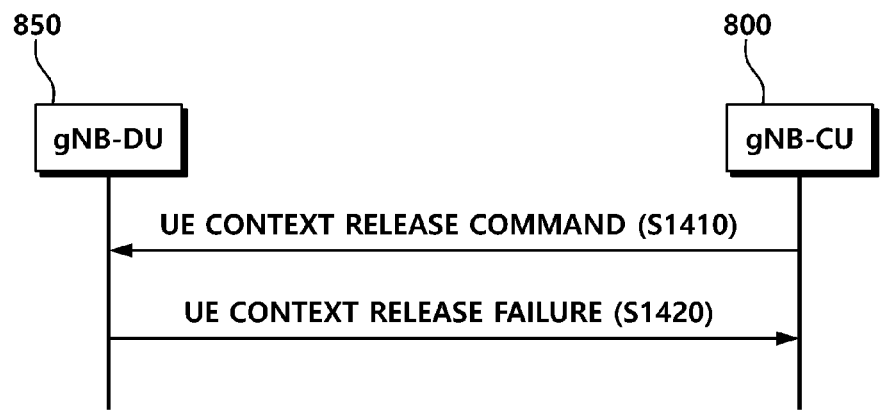
FIG. 14 illustrates a process of processing a UE context release message in case of failure of release according to an embodiment.

FIG. 14 illustrates a process of processing a UE context release message in case of failure of release according to an embodiment.

Referring to FIG. 14, the CU 800 may transmit, to the DU 850, a UE context release command message for releasing UE context configured in the DU 850 (S1410). For example, the CU 800 may transmit the UE context release command message in order to release a UE-associated logic connection.

When the UE context release command message is received, the DU 850 performs an operation of releasing all signaling and user data transmission resources for a corresponding UE. However, the DU 850 may be unable to release the corresponding UE context for some reason. For example, the release of some SRBs or DRBs is completed, but the DU 850 may fail to release the other radio bearers.

In this case, the DU 850 transmits a UE context release failure message to the CU 800 (S1420). The UE context release failure message may include a cause of the failure or information regarding the radio resources of which release failed.

In addition, similar to the UE context release, the CU 800 may transmit a DU RADIO RESOURCE DELETE message to the DU 850 in order to request that the DU 850 should release a specific cell or beam controlled by the DU 850.

The DU 850 informs the CU 850 that the release of the specific cell or beam is completed by transmitting a DU RADIO RESOURCE DELETE RESPONSE message to the CU 800. However, when the response is unnecessary, the corresponding response message may be omitted.

On the other hand, when the DU 850 fails to process a request corresponding to the DU RADIO RESOURCE DELETE message, the DU 850 informs the CU 800 of the failure by transmitting a DU RADIO RESOURCE DELETE FAILURE message to the CU 800. Likewise, when the response is unnecessary, the corresponding response message may be omitted.

The series of processes may be performed through the F1-C interface. Here, when the CU 800 is divided into the control plane node and user plane node, the CU 800 may be replaced by the CU-CP node.

As described above, the CU may request that the DU should set up UE context, set radio resources, and the like through the fronthaul interface, and the DU may provide a result of processing the request as a response.

On the other hand, as described above, the CU may be separated into a control plane node responsible for a control plane and a user plane node responsible for a user plane. In this case, a resource setup procedure through an internal interface is required. Hereinafter, the present invention will be described with reference to embodiments.

1. Procedure of Setting Up User Plane Node Resources of CU

In order to efficiently control virtualization of a plurality of CU-UP node devices controlled by a CU-CP node, the CU-CP node may request that the CU-UP node should transmit information regarding processing resources, load information, etc. of the CU-UP node or may request that the CU-UP node should set up a bearer.

Figure 15:
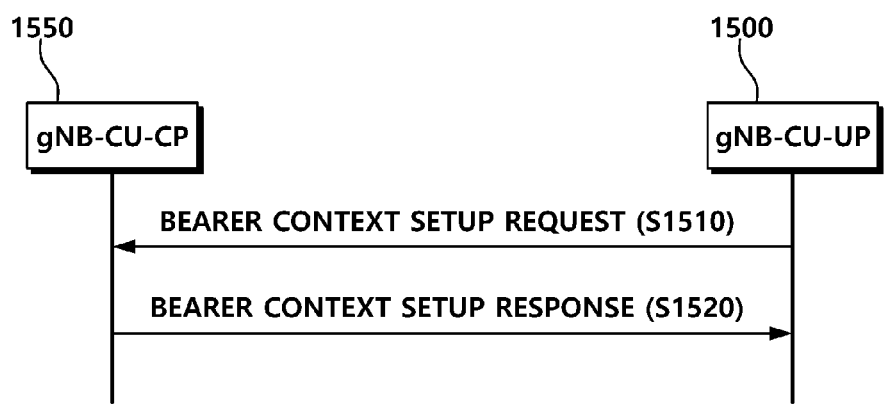
FIG. 15 illustrates a process of setting a bearer using an internal interface of a central unit in case of success of setting according to an embodiment.

FIG. 15 illustrates a processing of setting a bearer using an internal interface of a CU in case of success in setting according to an embodiment.

Referring to FIG. 15, the CU may include a control plane logic node 1500 and a user plane logic node 1550, which may be connected to each other through the E1 interface.

In order to set up bearer context, the control plane logic node 1500 may transmit, to the user plane logic node 1550, a bearer context setup request message including information for directing the setup (S1510).

The user plane logic node 1550 performs at least one of operations of storing, configuring, and setting the corresponding bearer context using information included in the bearer context setup request message.

When the setting of the bearer context is successful, the user plane logic node 1550 may transmit a bearer context setup response message to the control plane logic node 1500 through the E1 interface (S1520).

Figure 16:
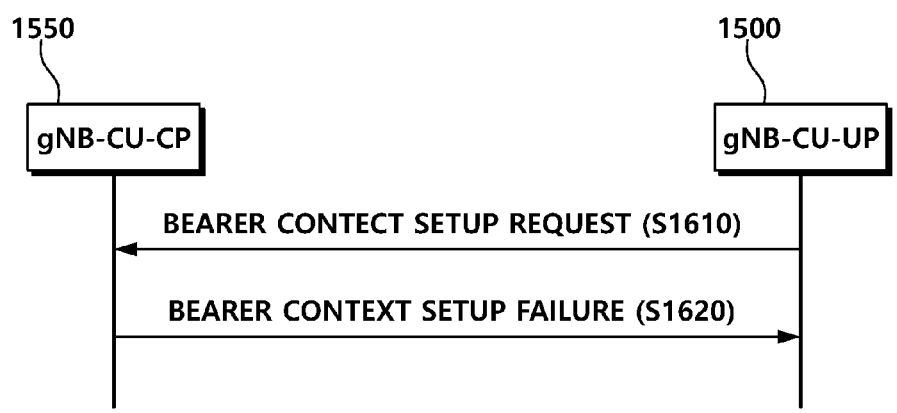
FIG. 16 illustrates a process off setting a bearer using an internal interface of a central unit in case of failure of setting according to an embodiment.

FIG. 16 illustrates a process of setting a bearer using an internal interface of a CU in case of failure of setting according to an embodiment.

Referring to FIG. 16, in order to set up bearer context, the control plane logic node 1500 may transmit, to the user plane logic node 1550, a bearer context setup request message including information for directing the setup (S1610).

The user plane logic node 1550 performs at least one of operations of storing, configuring, and setting the corresponding bearer context using information included in the bearer context setup request message.

When the setting of the bearer context fails, the user plane logic node 1550 may deliver a bearer context setup failure message to the control plane logic node 1500 through the E1 interface (S1620).

In addition, in order to efficiently control virtualization of a plurality of CU-UP nodes 1550 controlled by the CU-CP node 1500, the CU-CP node 1500 may transmit a CU RESOURCE MANAGEMENT REQUEST message to a CU-UP node 1550 to request or instruct the CU-UP node 1550 to transmit information regarding processing resources, load information, and the like of the CU-UP node 1550. Thus, the CU-UP node 1550 may perform operations of setting up, releasing, changing, and reporting corresponding resources.

Requested details and necessary information may be included in the corresponding request message. For example, Setup, Delete, Modify, Report, and the like may be used as a request message.

The CU-UP node 1550 may inform the CU-CP node 1500 of a result of processing the request message by transmitting a CU RESOURCE MANAGEMENT RESPONSE message to the CU-CP node 1500. However, when the response is unnecessary, the corresponding response message may be omitted.

When the CU-UP node 1550 fails to respond to the CU RESOURCE MANAGEMENT REQUEST message, the CU-UP node 1550 informs the CU-CP node 1500 of the failure by transmitting a CU RESOURCE MANAGEMENT FAILURE message to the CU-CP node 1500. Likewise, when the response is unnecessary, the corresponding response message may be omitted.

The series of messages may be processed through the E1-C interface.

Each message using the F1 interface or each message using the E1 interface may selectively include the following information elements as needed. The names of the following information elements are described as an example for convenience of understanding, and may be variously used when corresponding information is included. Accordingly, there is no limitation on their names.

CU UE F1AP ID: identifier for identifying UE connection on F1 interface in corresponding CU
DU UE F1AP ID: identifier for identifying UE connection on F1 interface in corresponding DU
CU-CP UE E1AP ID: identifier for identifying UE connection on E1 interface in corresponding CU-CP
CU-UP UE E1AP ID: identifier for identifying UE connection on E1 interface in corresponding CU-UP
CU ID: CU identifier
DU ID: DU identifier
CU Split ID: separation structure identifier inside CU
CU-CP Type ID: CU-CP structure identifier
CU-UP Type ID: CU-UP structure identifier
CU-CP ID: CU-CP node identifier
CU-UP ID: CU-UP node identifier
Cell ID: cell identifier
gNB ID: gNB identifier
Global gNB ID: global gNB identifier, which may be composed of PLMN ID and gNB ID
NG-RAN Cell ID (NCI): cell identifier, which may be composed of CU ID (or gNB ID), DU ID, and Cell ID
NG-RAN CGI: gNB global identifier, which may be composed of PLMN ID and NG-RAN cell ID
RRC Bearer: RRC bearer information to be transmitted
E-RAB ID: radio bearer identifier
UE Radio Capability: radio capability information of UE, which may include, for example, values corresponding to 5G, eLTE, and LTE
UE Category: supported maximum speed capability of NR and/or UE, which may be defined according to NSA (which may differ for each structure option) and SA-supported UE. NSA refers to a situation of cooperation with an LTE eNB rather than a standalone situation of a 5G gNB, and SA refers to a network situation in which only a 5G gNB is configured without cooperation with an LTE eNB.
GTP-TEID: all or some of gNB tunnel endpoint ID (TEID), CU TEID, and DU TEID can be used
Slice ID: network slicing identifier
QFI: QoS flow identifier
NG-RAN QoS Parameter: QoS parameter of gNB
TAI: CN-based TA identifier
RAN-TAI: RAN-based TA identifier As described above, according to the present embodiment, the 5G requires a large number of small cell gNBs in order to stably provide various services and satisfy a high-band frequency, a high-speed transmission rate, high reliability, and low latency. In this situation, by designing an internal interface of a 5G virtual gNB to be a standard-based open interface, it is possible to provide efficient interoperation between internal nodes of 5G gNBs of other equipment manufacturers. Thus, it is also possible to provide stable network connectivity and reduce construction/operating costs.

The names of the pieces of information included in the messages and the information elements that have been described with reference to FIGS. 1 to 16 have been described as an example, and the present disclosure is not limited thereto. That is, a message including corresponding functions and information is included in the information element or message described above irrespective of the term.

The configuration of the CU in which all of the embodiments described with reference to FIGS. 1 to 16 may be performed will be briefly described once again.

Figure 17:
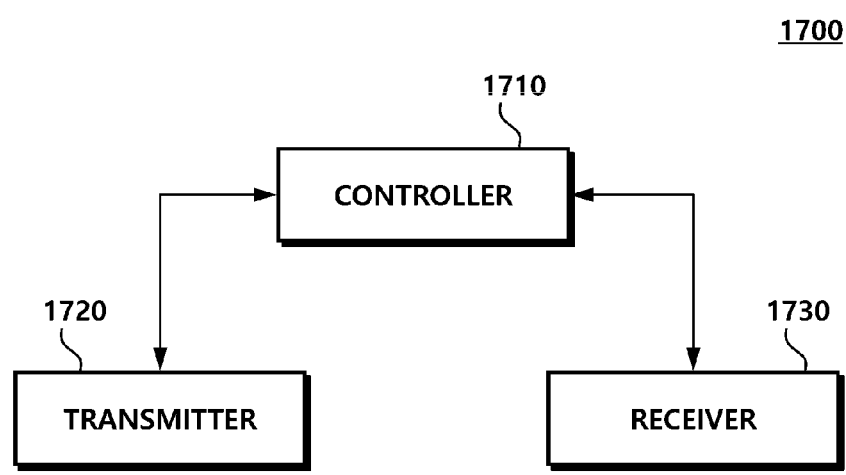
FIG. 17 shows a configuration of a central unit according to an embodiment.

FIG. 17 shows the configuration of the CU according to an embodiment.

Referring to FIG. 17, a CU 1700 included in a gNB and configured to manage radio resources includes a controller 1710 configured to generate a UE context setup message for transmission to one or more DUs associated with the CU 1700, a transmitter 1720 configured to transmit a UE context setup message to the one or more DUs through a fronthaul interface, and a receiver 1730 configured to receive a response message for the UE context setup message from the one or more DUs through the fronthaul interface.

For example, the CU 1700 may be configured to perform at least one of RRC, PDCP, RLC, and MAC network functions, and the DU may be configured to perform at least one of RLC, MAC, and PHY network functions.

Also, the transmitter 1720 transmits a UE context setup message including SRB and DRB configuration information through the fronthaul interface by using the F1 application protocol (F1AP). For example, the UE context setup message may further include at least one of secondary cell list information, DRX cycle information, uplink configuration information, SRB list information, and uplink GTP tunnel end point information.

The receiver 1730 may receive a response message for the transmitted UE context setup message through the F1 interface. For example, when the DU successfully sets SRBs or DRBs of the UE context setup message, the receiver 1730 may receive a UE context setup response message including at least one of list information for DRBs of which setting was successful, list information for DRBs of which setting failed, failure cause information, and information regarding SRBs of which setting failed. Also, when the DU may be unable to set UE context of the UE context setup message or when the DU may be unable to set either the SRBs or the DRBs included in the UE context setup message, the receiver 1730 may receive a UE context setup failure message including the failure cause information.

The transmitter 1720 may transmit the UE context release command message to the DU in order to release a UE-associated logic connection. Also, the transmitter 1720 may transmit the above-described UE context modification request message.

The controller 1710 may control a control plane logic node and a user plane logic node to be configured in the CU 1700 and to be connected through the E1 interface.

The control plane logic node may deliver a bearer context setup request message for instructing the user plane logic node to set bearer context to the user plane logic node through the E1 interface. When the setting of the bearer context is successful, the user plane logic node may deliver a bearer context setup response message to the control plane logic node through the E1 interface. When the setting of the bearer context fails, the user plane logic node may deliver a bearer context setup failure message to the control plane logic node through the E1 interface.

In addition, the controller 1710 controls the overall operation of the CU 1700, such as an operation of configuring a fronthaul interface between an internal CU and an internal DU constituting a 5G gNB and transmitting and receiving a message through the fronthaul interface and an operation of sharing a message between a control plane node and a user plane node in the CU 1700.

Also, the transmitter 1720 and the receiver 1730 are used to transmit and receive necessary messages to and from the DU and to and from each node through the F1 interface or the E1 interface needed to perform the above-described embodiments.

According to the present disclosure, it is possible to provide an interface capable of supporting virtualization of a base station using a next-generation radio technology and also provide efficient interoperation between internal nodes of the base station to provide stable network connectivity.

The terms "system," "processor," "controller," "component," "module," "interface," "model," "unit," and the like may generally refer to a computer-related entity such as hardware, a combination of hardware and software, software, or running software. For example, the above-described components may be, but are not limited to, a process driven by a processor, a processor, a controller, a control processor, an entity, an execution thread, a program, and/or a computer. For example, all of a controller or processor and an application running on the controller or processor may be elements. One or more elements may reside within a process and/or an execution thread and may be located in one system or distributed to two or more systems.

Specifications and standards mentioned in the foregoing embodiments are omitted herein to simplify the description of the present specification and constitute part of the present specification. Therefore, it should be understood that part of the specifications and standards can be added to the present specification or be specified in the claims within the scope of the present invention.

The above-described subject matter of the present disclosure is to be considered illustrative and not restrictive, and it should be understood that numerous other modifications and embodiments can be devised by those skilled in the art that will fall within the spirit and scope of the principles of the present disclosure. Therefore, the embodiments disclosed herein are intended not to limit but to describe the technical spirit of the present disclosure, and the scope of the present disclosure is not limited to the embodiments. The scope of the disclosure should be construed by the appended claims, and all technical sprits within the scope of their equivalents should be construed as included in the scope of the disclosure.

What is claimed is:

1. A method of a central unit included in a gNodeB (gNB) for managing resources, the method comprising:
   generating, by the central unit, a user equipment (UE) context setup message to be transmitted to one or more distributed units associated with the central unit;
   transmitting, by the central unit, the UE context setup message to the one or more distributed units through a fronthaul interface; and
   receiving a response message for the UE context setup message from the one or more distributed units through the fronthaul interface,
   wherein the UE context setup message includes signaling radio bearer and data radio bearer configuration information and is transmitted using an F1 Application Protocol (F1AP).

2. The method of claim 1,
   wherein the central unit and the one or more distributed units constitute the gNB,
   wherein the central unit is configured to perform at least one of radio resource control (RRC), packet data convergence protocol (PDCP), radio link control (RLC), and medium access control (MAC) network functions, and
   wherein each of the distributed units is configured to perform at least one of RLC, MAC, and physical layer (PHY) network functions.

3. The method of claim 1, wherein the UE context setup message further includes at least one of secondary cell list information, Discontinuous Reception (DRX) cycle information, uplink configuration information, signaling radio bearer list information, and uplink General Packet Radio Service (GPRS) Tunneling Protocol (GTP) tunnel end point information.

4. The method of claim 1, wherein when each of the distributed units successfully sets signaling radio bearers or data radio bearers of the UE context setup message, the response message for the UE context setup message is a UE context setup response message including at least one of list information for data radio bearers of which setting was successful, list information for data radio bearers of which setting failed, failure cause information, and information regarding signaling radio bearers of which setting failed.

5. The method of claim 1, wherein when each of the distributed units is unable to set UE context of the UE context setup message or when each of the distributed units is unable to set either the signaling radio bearers or data radio bearers included in the UE context setup message, the response message for the UE context setup message is a UE context setup failure message including failure cause information.

6. The method of claim 1, further comprising transmitting a UE context release command message to the distributed units in order to release a UE-associated logic connection,
   wherein when the UE context release command message is received, each of the distributed units releases all signaling and user data transmission resources and transmits a UE context release completion message to the central unit.

7. The method of claim 1,
   wherein the central unit includes a control plane logic node and a user plane logic node, and the control plane logic node and the user plane logic node are connected to each other through an E1 interface where the E1 interface is an interface between nodes physically or logically separated from one another in the central unit for delivering data between the nodes, and
   wherein the control plane logic node delivers a bearer context setup request message for instructing the user plane logic node to set bearer context to the user plane logic node through the E1 interface.

8. The method of claim 7, wherein when the setting of the bearer context is successful, the user plane logic node delivers a bearer context setup response message to the control plane logic node through the E1 interface.

9. The method of claim 7, wherein when the setting of the bearer context fails, the user plane logic node delivers a bearer context setup failure message to the control plane logic node through the E1 interface.

10. A central unit included in a gNodeB (gNB) for managing resources, the central unit comprising:
    a controller configured to generate a user equipment (UE) context setup message to be transmitted to one or more distributed units associated with the central unit;
    a transmitter configured to transmit the UE context setup message to the one or more distributed units through a fronthaul interface; and
    a receiver configured to receive a response message for the UE context setup message from the one or more distributed units through the fronthaul interface, wherein the UE context setup message includes signaling radio bearer and data radio bearer configuration information and is transmitted using an F1 Application Protocol (F1AP).

11. The central unit of claim 10,
wherein the central unit and the one or more distributed units constitute the gNB, and
wherein the central unit is configured to perform at least one of radio resource control (RRC), packet data convergence protocol (PDCP), radio link control (RLC), and medium access control (MAC) network functions, and
wherein each of the distributed units is configured to perform at least one of RLC, MAC, and physical layer (PHY) network functions.

12. The central unit of claim 10, wherein the UE context setup message further includes at least one of secondary cell list information, Discontinuous Reception (DRX) cycle information, uplink configuration information, signaling radio bearer list information, and uplink General Packet Radio Service (GPRS) Tunneling Protocol (GTP) tunnel end point information.

13. The central unit of claim 10, wherein when each of the distributed units successfully sets signaling radio bearers or data radio bearers of the UE context setup message, the response message for the UE context setup message is a UE context setup response message including at least one of list information for data radio bearers of which setting was successful, list information for data radio bearers of which setting failed, failure cause information, and information regarding signaling radio bearers of which setting failed.

14. The central unit of claim 10, wherein when each of the distributed units is unable to set UE context of the UE context setup message or when each of the distributed units is unable to set either the signaling radio bearers or data radio bearers included in the UE context setup message, the response message for the UE context setup message is a UE context setup failure message including failure cause information.

15. The central unit of claim 10,
wherein the transmitter further transmits a UE context release command message to the distributed units in order to release a UE-associated logic connection, and
wherein when the UE context release command message is received, each of the distributed units releases all signaling and user data transmission resources and transmits a UE context release completion message to the central unit.

16. The central unit of claim 10,
wherein the central unit includes a control plane logic node and a user plane logic node, and the control plane logic node and the user plane logic node are connected to each other through an E1 interface where the E1 interface is an interface between nodes physically or logically separated from one another in the central unit for delivering data between the nodes, and
wherein the control plane logic node delivers a bearer context setup request message for instructing the user plane logic node to set bearer context to the user plane logic node through the E1 interface.

17. The central unit of claim 16, wherein when the setting of the bearer context is successful, the user plane logic node delivers a bearer context setup response message to the control plane logic node through the E1 interface.

18. The central unit of claim 16, wherein when the setting of the bearer context fails, the user plane logic node delivers a bearer context setup failure message to the control plane logic node through the E1 interface.

* * * * *